(12) United States Patent
Aoki et al.

(10) Patent No.: US 6,338,695 B1
(45) Date of Patent: Jan. 15, 2002

(54) VEHICULAR TRANSMISSION CONTROL SYSTEM

(75) Inventors: Akihira Aoki; Yukihiko Fukushima, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 8 days.

(21) Appl. No.: 09/621,352

(22) Filed: Jul. 20, 2000

(30) Foreign Application Priority Data

Jul. 23, 1999 (JP) .......................................... 11-209932

(51) Int. Cl.$^7$ .............................................. B60K 41/18
(52) U.S. Cl. .......................................... 477/160; 477/48
(58) Field of Search ............................. 477/45, 46, 48, 477/49, 158, 160, 161

(56) References Cited

U.S. PATENT DOCUMENTS

| | | | | |
|---|---|---|---|---|
| 4,751,859 A | * | 6/1988 | Itoh et al. ................ | 477/48 X |
| 4,790,214 A | * | 12/1988 | Hattori et al. ................ | 477/48 |
| 5,157,992 A | * | 10/1992 | Hayashi et al. ........... | 477/45 X |
| 5,211,083 A | * | 5/1993 | Hattori et al. ................ | 477/39 |
| 5,514,047 A | * | 5/1996 | Tibbles et al. ................ | 477/46 |
| 6,086,513 A | * | 7/2000 | Tominaga .................... | 477/169 |

FOREIGN PATENT DOCUMENTS

GB 2076483 * 12/1981 ................ 477/47

* cited by examiner

*Primary Examiner*—Charles A. Marmor
*Assistant Examiner*—Ha Ho
(74) *Attorney, Agent, or Firm*—Armstrong, Westerman, Hattori, McLeland & Naughton, LLP (57) ABSTRACT

After the engine rotational speed Ne has become below a reference rotaional speed Neo, which is lower than an idling rotational speed of the engine, and after the pressure PL of oil passages 103a and 103b has begun to decrease, for a predetermined time, the currents supplied to electromagnetic valves 45 and 46 are adjusted to generate, in each electromagnetic valve, a second biasing force electromagnetically in a magnitude that can supplement a decrease in a third biasing force which is generated by the back pressure led through an oil passage 107 and 108, respectively, and which decreases as the pressure of the oil passages 103a and 103b decreases. After the above metioned predetermined time has elapsed, the currents supplied to the eletromagnetic valves 45 and 46 are set almost to zero.

5 Claims, 9 Drawing Sheets

VEHICULAR TRANSMISSION CONTROL SYSTEM

FIELD OF THE INVENTION

The present invention relates generally to a vehicular transmission which comprises a transmission capable of varying its speed change ratio and of transmitting the driving force output from the engine to the drive wheels of a vehicle.

BACKGROUND OF THE INVENTION

Such vehicular transmissions have been used for mechanical power transmission in vehicles. As speed change mechanisms incorporated in these transmissions, not only gear transmissions with a plurality of speed ratios but also continuously variable transmissions with a belt, etc. have been used for speed change control. Recently, a hybrid transmission which uses an electrical motor in addition to an engine has been introduced for fuel efficiency. The applicant of the present invention is also developing a hybrid transmission. This hybrid transmission comprises a continuously variable transmission with a metal V-belt which is disposed around the common output shaft of an engine a and an electrical motor arranged in series, and the output shaft of the continuously variable transmission is provided with a forward/reverse switching mechanism and a starting clutch (main clutch).

One purpose for developing this transmission is to improve fuel efficiency. Therefore, there is a consideration that the operation of the engine be controlled such that it stops when the vehicle has stopped (referred to as "idling elimination"). As such idling elimination control, there is a method to stop the engine when the engine comes into idling after the vehicle has stopped completely. However, when the vehicle is decelerated by releasing the accelerator pedal that has been depressed, an engine brake is effected. It is known that, during this deceleration, the fuel injection to the engine is terminated (or the supply of fuel is terminated). In this situation, there is a more desirable way to eliminate engine idling. When the vehicle is decelerated to a halt, the fuel injection is terminated, so this condition should be maintained to stop the engine. This method seems more favorable for improving the fuel efficiency.

When the engine is stopped to avoid engine idling, the transmission is set at a LOW ratio, and the supply of electricity to the electromagnetic valves (solenoid valves) which control the speed change operation may be stopped (or the electrical currents supplied are reduced almost to zero) because there is no need to perform any speed change. While the engine is not operated, preferably, the supply of electricity to such electromagnetic valves be terminated, and the charge in the battery be conserved for the time being. In this way, the charge in the battery can be used more advantageously to power the electrical motor in an effective way. Generally, the electromagnetic valves are disposed between a hydraulic pump which is driven by the engine and hydraulically operated actuators which systematically set the speed change ratio of the transmission. The spool of each of these valves is disposed in a fine balance of biasing forces which are generated by a resilient member such as spring, by the electromagnetism created by a current through the solenoid of the valve and by a back pressure fed back from the control pressure that controls the actuation of an actuator, and they are systematically controlled to change the control pressures which effect the speed change operation of the transmission.

If the operation of the engine is being terminated to avoid idling, and when the rotational speed of the engine decreases below the idling rotational speed of the engine, the output of the hydraulic pump, which is driven by the engine, attenuates. As the pressure of the hydraulic circuit of the transmission decreases, the back pressure acting on each electromagnetic valve also decreases. In this situation, once the pressure of the hydraulic circuit has begun decreasing, even though the electrical current necessary for maintaining the speed change ratio of the transmission at a LOW ratio is provided continuously, the spool of each electromagnetic valve starts to shift in the direction of the force generated the resilient member because the decreasing back pressure creates a change in the above described balance. As the spool comes close to the wall of the housing of the respective valve, it happens to cause a chattering, which is a displeasing vibration and a noise.

SUMMARY OF THE INVENTION

It is an object of the present invention to provide a control system for a vehicular transmission which system is capable of preventing electromagnetic valves from chattering when the pressure of the hydraulic circuit of the transmission decreases as the operation of the engine is terminated to avoid engine idling.

In order to achieve this objective, the present invention provides a first embodiment of control system for a mechanical power transmission which is used for driving a vehicle. This control system comprises an engine, a speed change mechanism (for example, the continuously variable transmission CVT of the embodiment described in the following section), a hydraulic pump and an electromagnetic valve (for example, the drive-pulley electromagnetic valve 45 and the driven-pulley electromagnetic valve 46 of the following embodiment). The speed change mechanism transmits the driving force of the engine with speed change, and the hydraulic pump is driven by the engine to deliver hydraulic oil. The electromagnetic valve is disposed between a first oil passage (for example, the oil passage 103a and the oil passage 103b of the following embodiment) and a second oil passage (for example, the oil passage 107 and the oil passage 108 of the following embodiment). In this arrangement, the first oil passage leads to the pump while the second oil passage leads to a speed change actuator (for example, the variable width drive pulley 11 and the variable width driven pulley 16 of the following embodiment) of the speed change mechanism. The electromagnetic valve adjusts the pressure of the oil to control the speed change actuator in a balance of first, second and third biasing forces and delivers this control pressure into the second oil passage. Here, the first biasing force is generated by a resilient member, the second biasing force is generated electromagnetically, and the third biasing force is generated by the back pressure from the second oil passage. In this arrangement, the system according to the present invention controls the vehicular transmission in the following way. After the rotational speed of the engine has become below a reference rotational speed which is lower than an idling rotational speed and after the pressure of the first oil passage begins to decrease, for a predetermined time, the current to the electromagnetic valve is adjusted and supplied to generate the second biasing force in a magnitude that can supplement a decrease in the third biasing force, which decrease is caused from a decrease in the pressure of the first oil passage. Then, after the predetermined time has elapsed, the current supplied to the electromagnetic valve is set almost to zero. The above mentioned predetermined time corresponds, for example, to a time which takes, after the pressure of the first oil passage begins to decrease, for the spool of the electromagnetic valve to be pushed and shifted toward the wall of the housing of the valve by the resilient member as the third biasing force decreases, so as to result in a chattering with the wall.

In this first embodiment of control system according to the present invention, if the rotational speed of the engine decreases below the reference rotational speed, which is lower than the idling rotational speed of the engine, for example, in an engine idling elimination control, and when the pressure of the first oil passage begins to decrease, for the predetermined time, the current to the electromagnetic valve is adjusted and supplied to generate the second biasing force in a magnitude that can supplement the third biasing force which decreases in correspondence with the decreasing pressure of the first oil passage. Therefore, it is not possible for the spool of the electromagnetic valve to shift in correspondence to the decrease in the pressure of the first oil passage, so no chattering of the spool with the wall of the housing will occur. Thus, the control system according to the present invention effectively prevents the electromagnetic valve from causing any displeasing vibration and noise. In addition, after the elapse of the predetermined time, the current to the electromagnetic valve is set almost to zero. By terminating the cause of chattering in this way, a further prevention is made against vibrations and noises. As described above, even though the engine rotational speed becomes below the reference rotational speed, the electromagnetic valve is supplied with a current which is sufficient to maintain the speed change ratio of the transmission at a LOW ratio until the pressure of the first oil passage begins to decrease. In this way, even in a case where the transmission comprises a belt type continuously variable transmission, a predetermined pressure is secured for controlling pulleys which are incorporated in the transmission, thereby preventing the belt from slipping.

A second embodiment of control system according to the present invention comprises an engine, a speed change mechanism, a hydraulic pump and an electromagnetic valve. The speed change mechanism transmits the driving force of the engine with speed change, and the hydraulic pump is driven by the engine to deliver hydraulic oil. The electromagnetic valve is disposed between a first oil passage and a second oil passage, and the first oil passage leads to the pump while the second oil passage leads to a speed change actuator of the speed change mechanism. The electromagnetic valve adjusts the pressure of the oil to control the speed change actuator, in a balance of first, second and third biasing forces, and delivers this control pressure into the second oil passage. Here, the first biasing force is generated by a resilient member, the second biasing force is generated electromagnetically, and the third biasing force is generated by the back pressure from the second oil passage. In this arrangement, the system according to the present invention controls the vehicular transmission in the following way. After the rotational speed of the engine has become below a reference rotational speed which is lower than an idling rotational speed and after the pressure of the first oil passage begins to decrease, the current supplied to the electromagnetic valve is set almost to zero.

In this second embodiment of control system according to the present invention, if the rotational speed of the engine decreases below the reference rotational speed, which is lower than the idling rotational speed of the engine, for example, in an engine idling elimination control, and when the pressure of the first oil passage begins to decrease, the current to the electromagnetic valve is adjusted almost to zero. By terminating the cause of chattering in this way, a further prevention is made against vibrations and noises. As in the above described first control system, also in this control system, even though the engine rotational speed becomes below the reference rotational speed, the electromagnetic valve is supplied with a current sufficient to maintain the speed change ratio of the transmission at a LOW ratio until the pressure of the first oil passage begins to decrease. In this way, even if the transmission comprises a belt type continuously variable transmission, a predetermined pressure is secured for controlling pulleys which are incorporated in the transmission, thereby preventing the belt from slipping.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
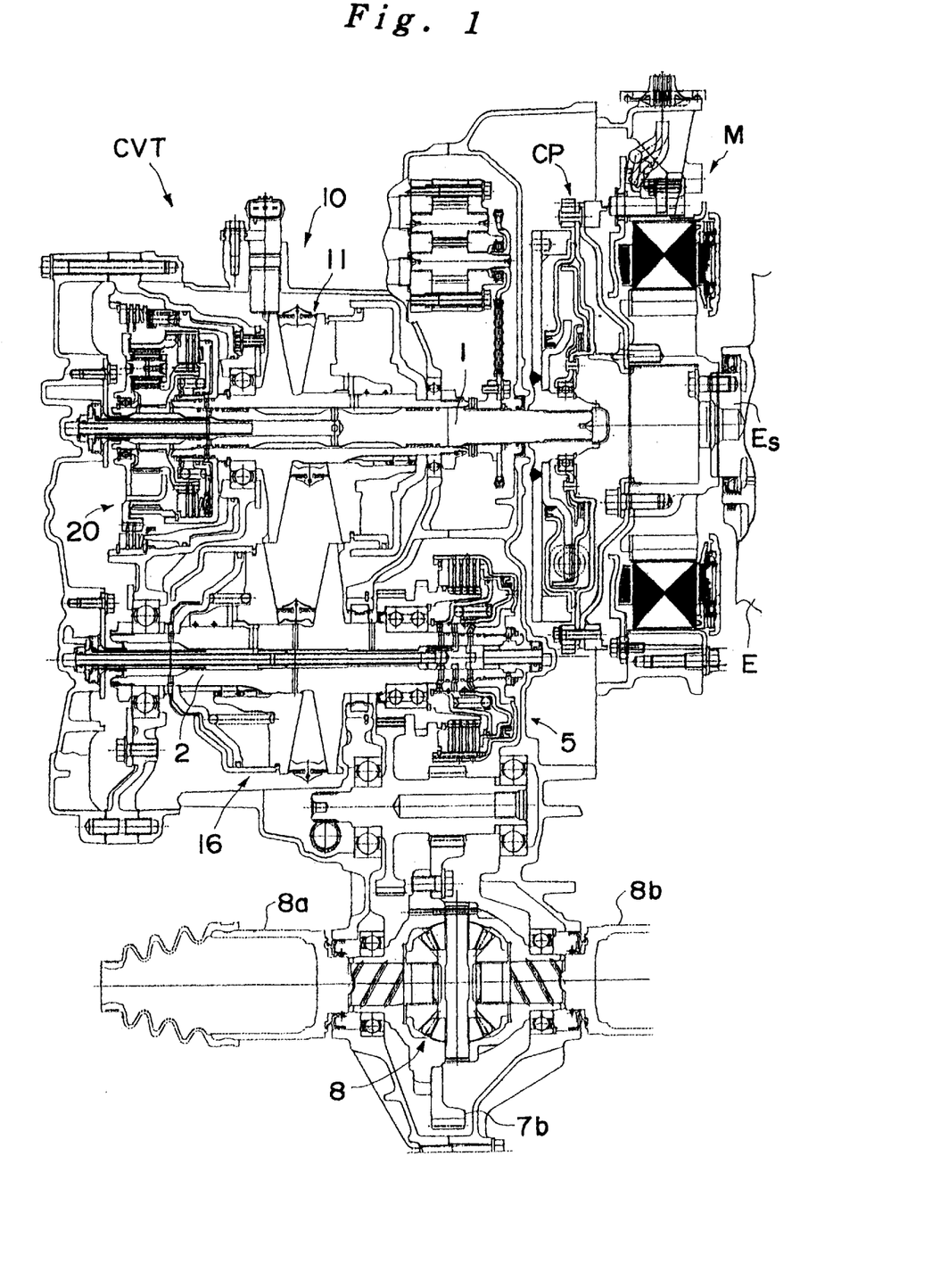
FIG. 1 is a cross-sectional view of a vehicular transmission which incorporates a control system according to the present invention.
Figure 2:
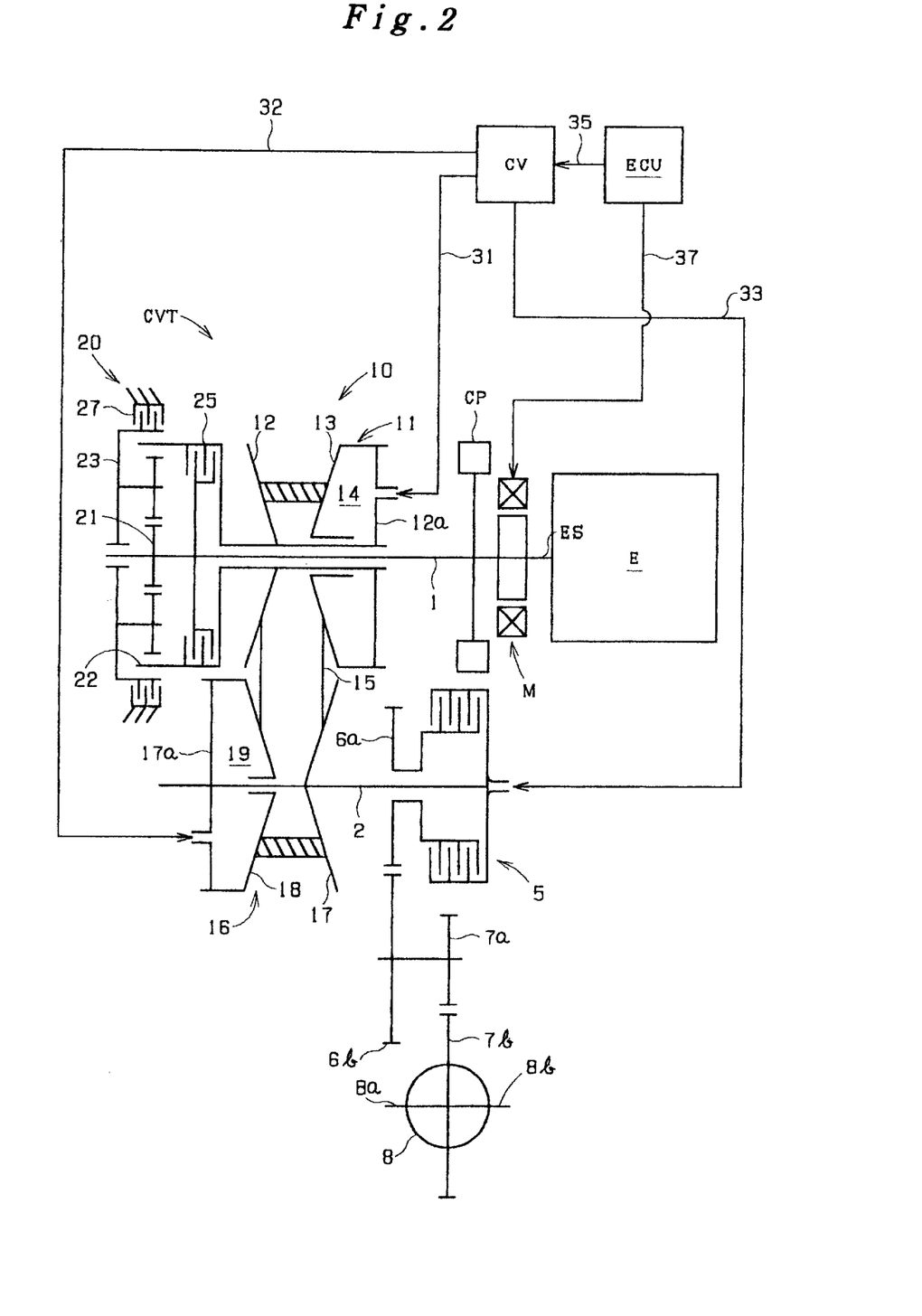
FIG. 2 is a schematic diagram showing the construction of the power transmission mechanism of this transmission.

FIG. 1 is a cross-sectional view of a vehicular transmission which incorporates a control system according to the present invention. FIG. 2 shows the construction of the power transmission mechanism of this vehicular transmission, which comprises an engine E, an electrical motor M, and a continuously variable transmission CVT. The electrical motor M is disposed over the output shaft Es of the engine while the continuously variable transmission CVT is connected through a coupling mechanism CP to the engine output shaft Es. The engine E is a fuel injection engine, so the injection of fuel into the engine is terminated when the vehicle decelerates as described in detail later in this section. The electrical motor M is powered by a battery which is mounted on the vehicle, and the electrical motor assists the driving force of the engine. In this way, the vehicular transmission is constructed as a hybrid transmission with these two power sources.

The continuously variable transmission CVT comprises a metal V-belt mechanism 10, a forward/reverse switching mechanism 20 and a starting clutch (or main clutch) 5. The metal V-belt mechanism 10 is disposed around the input shaft 1 and the countershaft 2 of the transmission, the forward/reverse switching mechanism 20 is disposed over the input shaft 1, and the starting clutch 5 is disposed on the countershaft 2. This continuously variable transmission CVT is mounted on a vehicle, and the input shaft 1 is connected through a coupling mechanism CP with the output shaft Es of the engine. The driving force output from the transmission is transmitted through the starting clutch 5 to the differential mechanism 8 and then used for driving axle shafts 8a and 8b to rotate the right and left wheels of the vehicle (not shown).

The metal V-belt mechanism 10 comprises a variable width drive pulley 11, which is disposed over the input shaft 1, a variable width driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which is movable with respect to the stationary pulley half 12 in the axial direction of the pulley 11. On the outside of the movable pulley half 13, a drive-pulley cylinder chamber 14 is defined by a cylinder wall 12a which is fixed to the stationary pulley half 12. The pressure supplied through a control valve CV and through an oil passage 31 into the cylinder chamber 14 (this pressure is referred to as "drive pulley pressure") generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the outside of the movable pulley half 18, a driven-pulley cylinder chamber 19 is defined by a cylinder wall 17a which is fixed to the stationary pulley half 17. The pressure supplied through the control valve CV and through an oil passage 32 into the cylinder chamber 19 (this pressure is referred to as "driven pulley pressure") generates a thrust which shifts the movable pulley half 18 in the axial direction of the driven pulley.

In this construction, the control system controls the hydraulic pressures which are supplied into these cylinder chambers 14 and 19, respectively, (the side thrusts of the drive and driven pulleys) by the control valve CV to generate appropriate lateral thrusts in these two pulleys. Specifically, the system, while preventing any slip of the belt 15, adjusts the difference between the pressures supplied to the drive and driven pulleys, so that the side thrusts generated in the respective pulleys change the widths of the V grooves of the drive and driven pulleys 11 and 16. Thereby, the pitch radii of the respective pulleys for the V belt 15 are changed to vary the speed change ratio of the transmission continuously.

Furthermore, the forward/reverse switching mechanism 20 is a planetary gear train, which comprises a sun gear 21, a ring gear 22, a carrier 23 and a forward clutch 25. The sun gear 21 is connected to the input shaft 1, and the ring gear 22 is connected to the stationary pulley half 12 of the drive pulley 11. The carrier 23 can be held against rotation by a reverse brake 27, and the forward clutch 25 can be operated to connect the sun gear 21 with the ring gear 22. In this mechanism 20, when this forward clutch 25 is engaged, all the gears 21, 22 and 23 rotate together with the input shaft 1 as a one body, and the drive pulley 11 is driven by the driving force of the engine E in the same direction as the input shaft 1 (i.e., in the forward direction of the vehicle). On the other hand, when the reverse brake 27 is engaged, the carrier 23 is held stationary, so the ring gear 22 rotates in the direction opposite to that of the sun gear 21, and the drive pulley 11 is driven by the driving force of the engine E in the direction opposite to that of the input shaft 1 (i.e., in the reverse direction).

The starting clutch 5 is a clutch to control the power transmission between the countershaft 2 and the output members of the transmission, i.e., gears 6a, 6b, 7a and 7b. When the starting clutch 5 is engaged, the power is transmitted therebetween. In the condition where the starting clutch 5 is engaged, the output of the engine, after undergoing the speed change by the metal V-belt mechanism 10, is transmitted through the gears 6a, 6b, 7a and 7b to the differential mechanism 8 and then divided and transmitted by the differential mechanism 8 to the right and left wheels. When the starting clutch 5 is released, this power transmission is terminated, and the transmission comes into a neutral condition. The engagement of the starting clutch 5 is carried out by a pressure supplied through the control valve CV and through an oil passage 33 (this pressure is referred to as "clutch control pressure").

In the continuously variable transmission CVT, the drive and driven pulley pressures supplied through the control valve CV and through the oil passages 31 and 32, respectively, are used for the speed change control while the clutch control pressure supplied through the control valve CV and through the oil passage 33 is used for the actuation of the starting clutch. The control valve CV itself is controlled by means of control signals sent from an electrical control unit ECU.

In the vehicle incorporating this transmission, the electrical motor M assists the engine E such that the engine E can operate in a range which is most fuel efficient. To improve the fuel efficiency of the vehicle, the operation of the electrical motor M is controlled by means of control signals which are sent from the electrical control unit ECU through a line 37. At the same time, the speed change control is performed to achieve an optimal speed change ratio for operating the engine E in a most fuel efficient manner. This control is also carried out by means of control signals sent from the electrical control unit ECU through a line 35 to the control valve CV.

To further improve the fuel efficiency of the transmission, the control system additionally performs an idling elimination control. Basically, this idling elimination control is to stop the operation of the engine E when the vehicle stops, and when the driving force of the engine E becomes unnecessary, i.e, the engine enters into an idling condition. However, to achieve a higher level of fuel efficiency, this system goes further than this basic control. Specifically, the system terminates the fuel supply to the engine and, maintaining this condition, performs the idling elimination control. In addition, it controls to terminate the supply of the electricity to the electromagnetic valves which are provided for speed change control in the continuously variable transmission CVT. In this way, the system minimizes the discharge of electricity while the engine is not operated for idling elimination.

Figure 6:
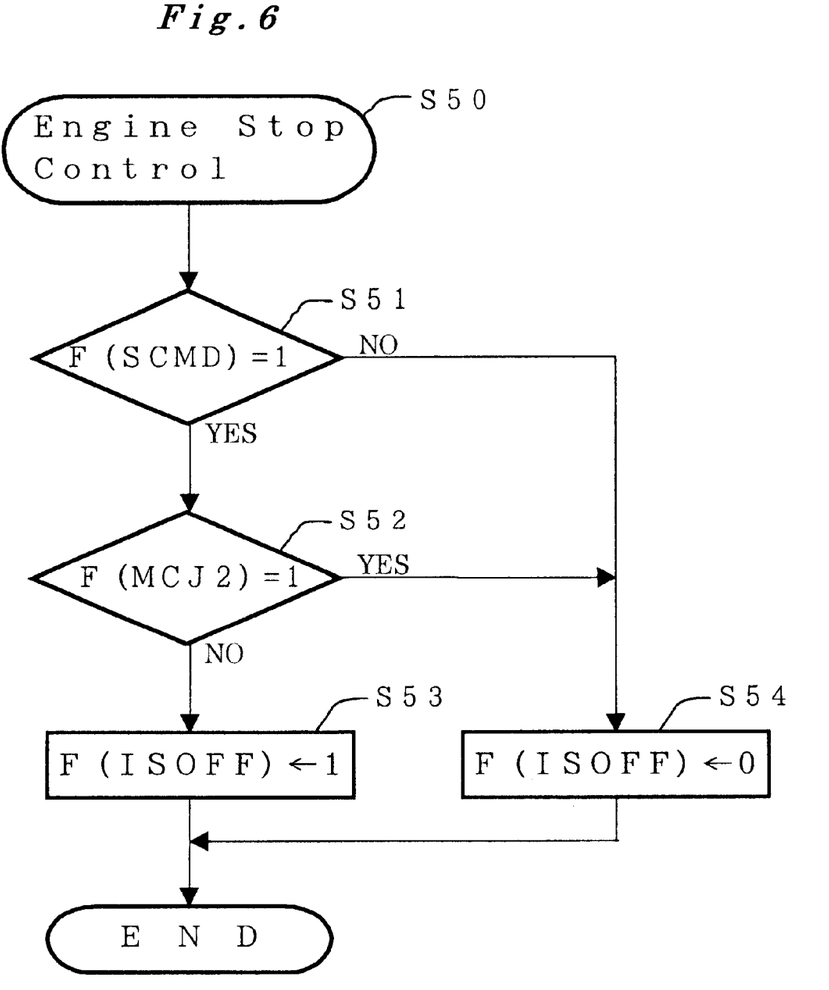
FIG. 6 is another flowchart showing yet further steps of the idling elimination control.
Figure 7:
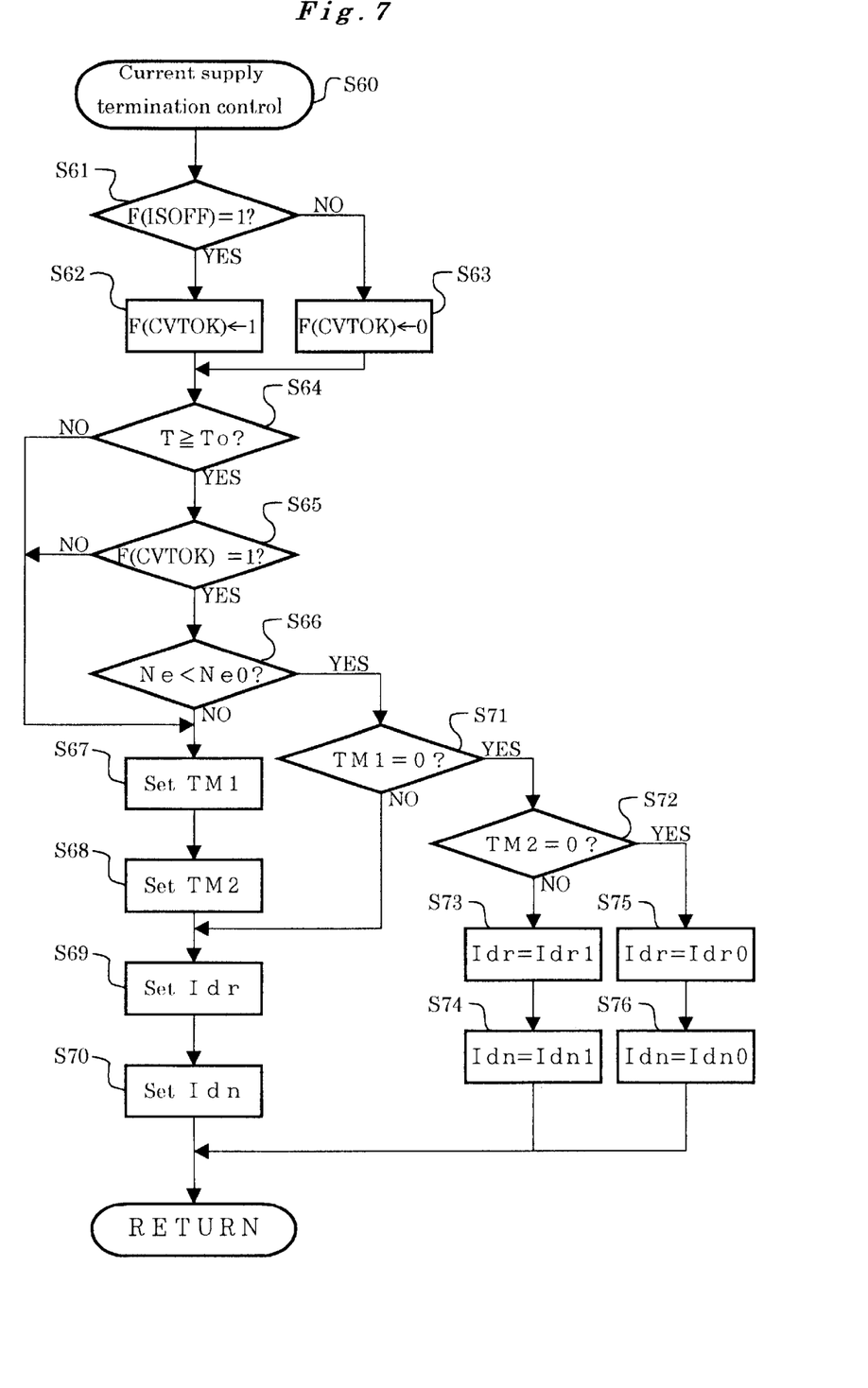
FIG. 7 is a flowchart showing steps of a control which terminates the supply of the electrical current to the transmission.
Figure 8:
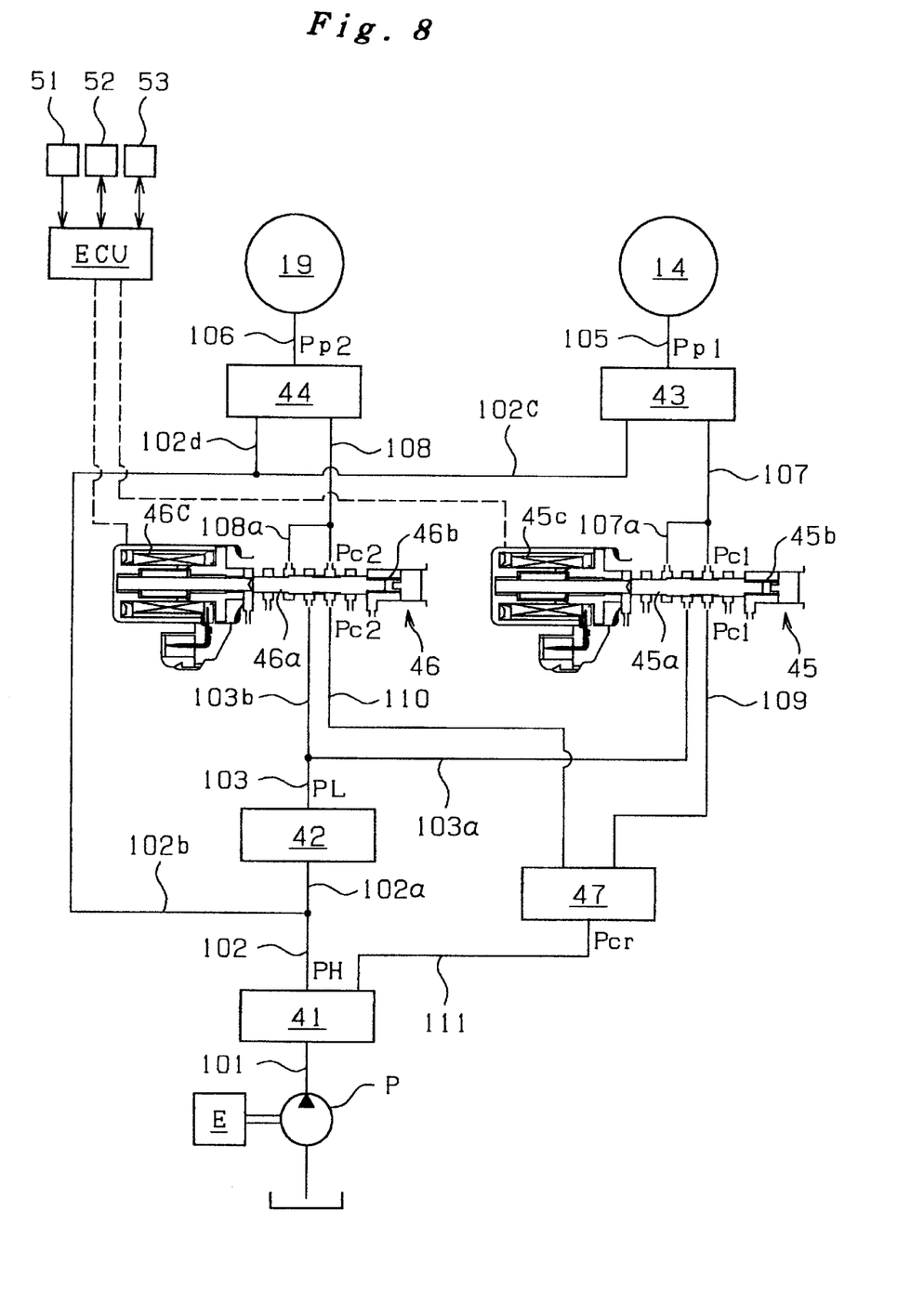
FIG. 8 is a diagram showing a hydraulic circuit which controls the speed change operation of the transmission.

Now, these idling elimination control and current supply termination control, which are executed on condition that the fuel injection is terminated to decelerate the vehicle, are described in reference to the flowcharts shown in FIGS. 3–7 and to the hydraulic circuit diagram shown in FIG. 8.

Figure 3:
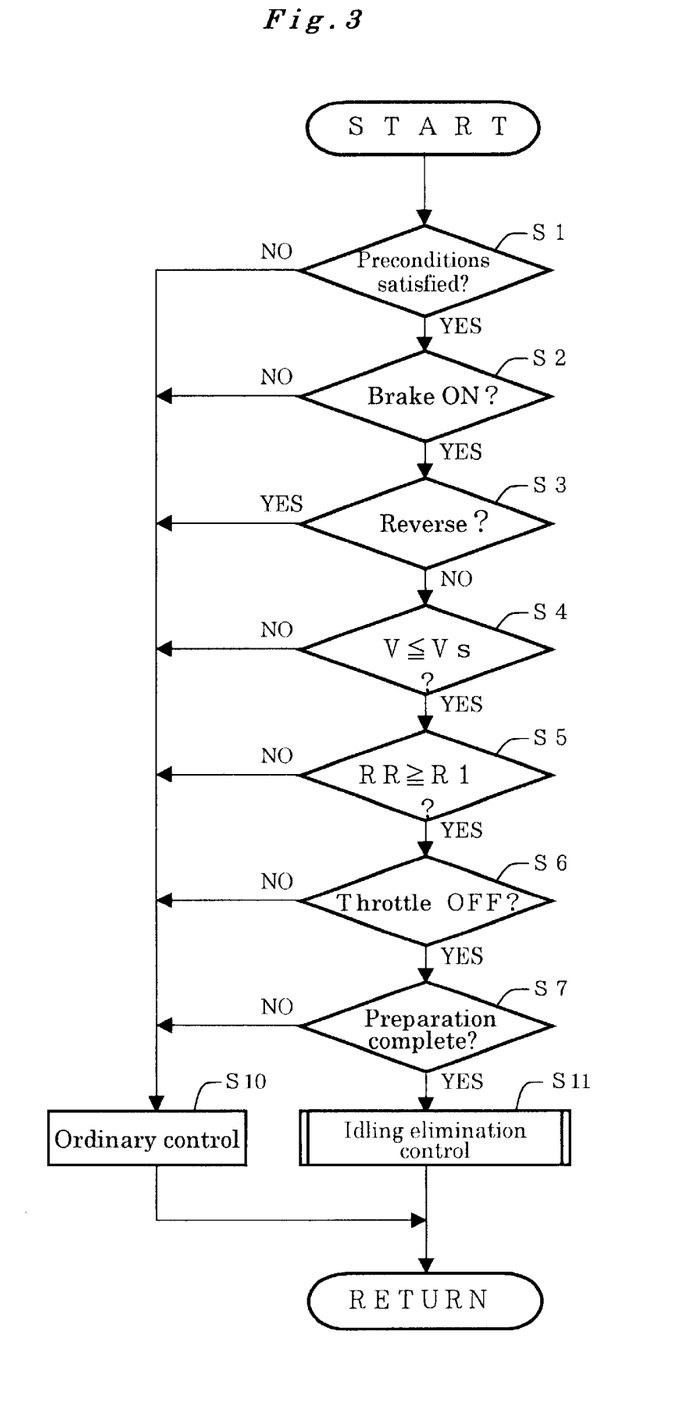
FIG. 3 is a flowchart showing some steps of an idling elimination control according to the present invention, which control is effective when the transmission is operated to decelerate.

This control begins at Step S1 shown in FIG. 3, where a judgment is made to find out whether a precondition for the idling elimination control is satisfied or not. As preconditions, for example, the temperature of the oil in the transmission must be above a predetermined value so as not to cause any retardation in responsive actions, and the slope regression inhibitor of the transmission is in good condition. If such preconditions are not satisfied, then the control routine proceeds to Step S10 to control the engine in an ordinary way. In other words, if the preconditions for the termination of the fuel injection are not satisfied, then the control resumes the fuel injection control. The above mentioned slope regression inhibitor functions to retain an enough hydraulic pressure for the brake to keep the vehicle stationary on a slope even while the driver is not depressing the brake pedal.

If the judgment at Step S1 is that the preconditions are satisfied, then the control routine proceeds to Step S2, where a determination is made whether the brake of the vehicle is on or off, i.e., the brake pedal is depressed or not. If the brake is off, then the control routine proceeds to Step S10 to perform the ordinary drive control. On the other hand, if the brake is on, then the control proceeds to Step S3, where a determination is made whether the transmission is in the reverse drive range or not. The idling elimination control is executed only while the transmission is in the forward drive range. Therefore, if the determination indicates that the transmission is in the reverse drive range, then the control routine proceeds to Step S10 to perform the ordinary drive control. On the other hand, if the transmission is not in the reverse drive range, then the control routine proceeds to Step S4, where a determination is made whether the speed V of the vehicle is equal to or lower than a predetermined speed Vs (e.g., 15 km/h) or not. The idling elimination control is a control which is executed when the vehicle is being stopped. Therefore, if the vehicle is not driving at a low speed, the control routine proceeds to Step S10 to perform the ordinary drive control.

When the speed of the vehicle decreases below the predetermined speed, the control routine proceeds to Step S5, where a determination is made whether the reduction ratio RR of the transmission is equal to or greater than a predetermined reduction ratio R1 (LOW ratio) or not. The idling elimination control is executed to stop the engine, so if the engine is stopped, then the speed change ratio cannot be changed thereafter. Therefore, it is necessary that the speed change ratio be adjusted to a LOW ratio before the start of the idling elimination control, so that the vehicle can be started smoothly after the restart of the engine. Thus, the predetermined reduction ratio R1 is a ratio (=2.2) near the LOW ratio (=2.4), and the determination at Step S5 is to determine whether the reduction ratio of the transmission has become a ratio near the LOW ratio or not. Until such a ratio is achieved, the control routine proceeds to Step S10 to perform the ordinary drive control. When such a ratio is achieved, the control routine proceeds to Step S6, where a determination is made whether the throttle of the engine is closed completely or not. If the throttle is open, i.e., the accelerator pedal is depressed by the driver, then the control routine proceeds to Step S10 to perform the ordinary drive control, and the idling elimination control is not executed because the driver is judged having no intention to stop the vehicle.

As described above, only if the preconditions are satisfied, the brake is on, the transmission is not in the reverse drive range, the vehicle is driving at a speed lower than the predetermined speed, the reduction ratio is almost at the LOW ratio, and the throttle is closed completely, then the idling elimination control is executed. However, before the idling elimination control, further determinations are made at Step S7 whether preparations for the idling elimination control are complete or not. Here, for example, if the air conditioner of the vehicle is on or not, if there is enough charge in the battery or not, and if the negative pressure used to assist the operation of the brake is at an appropriate level or not are determined. If the air conditioner is on, if the battery do not have enough charge, or if the negative pressure for assisting the brake is short, then the control routine proceeds to Step S10 to perform the ordinary drive control. On the other hand, if these preparations are judged complete, then the control routine proceeds to Step S11, where the control transits to the idling elimination control.

Figure 4:
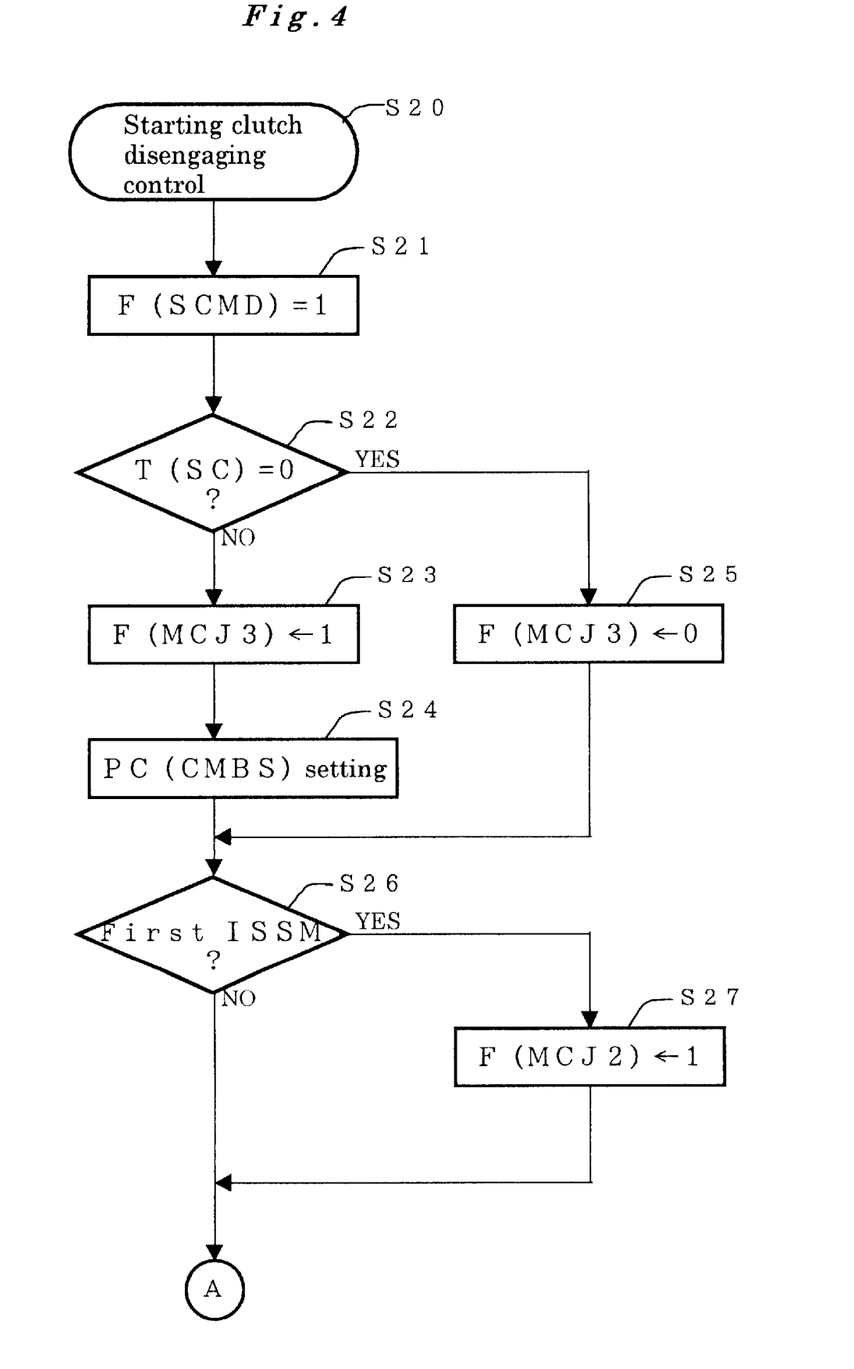
FIG. 4 is another flowchart showing further steps of the idling elimination control.
Figure 5:
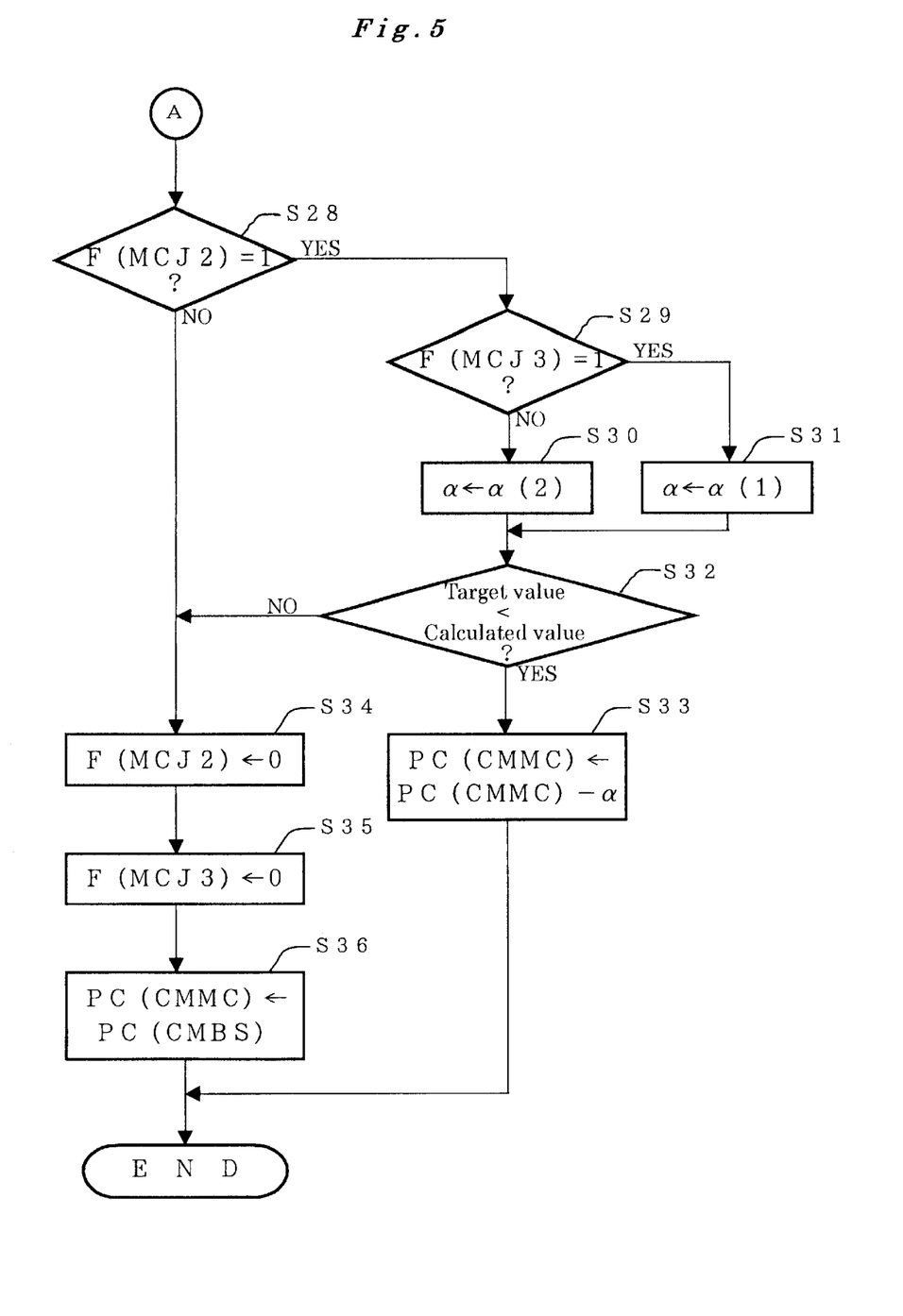
FIG. 5 is another flowchart showing still further steps of the idling elimination control.

The idling elimination control comprises a starting clutch disengaging control S20 shown in FIGS. 4 and 5 (the circled "A" of the flowchart in FIG. 4 connects with that of FIG. 5, making up a continuous flowchart) and an engine stop control S50 shown in FIG. 6.

At first, a description is given of the starting clutch disengaging control S20. In this control, firstly, a starting clutch off mode selection flag is set up, F (SCMD)=1, at Step S21 to indicate that the control flow has arrived at Step S11. This flag is used as a judgment flag in the engine stop control shown in FIG. 6. Next, at Step S22, a determination is made whether the torque capacity of the starting clutch 5 has become zero, T (SC)=0, or not. If it is not zero, T (SC)≠0, then the control routine proceeds to Step S23, where a clutch gradual release flag is set up F (MCJ3)=1. Then, at Step S24, a target clutch pressure PC (CMBS) is set for the starting clutch 5. This target clutch pressure PC (CMBS) is a pressure to control the clutch so that the torque capacity of the starting clutch becomes zero, T(SC)=0. On the other hand, if the torque capacity is zero, T (SC)=0, then the control routine proceeds to Step S25, where the clutch gradual release flag is set down, F (MCJ3)=0.

Then, the control routine proceeds to Step S26, where a determination is made whether or not this is the first flow through the starting clutch disengaging control. If it is the first flow, then a disengagement control flag is set up, F (MCJ2)=1, at Step S27. It is clear from this that the disengagement control flag is set up, F (MCJ2)=1, when the starting clutch disengaging control has just started.

Then, the control routine proceeds to Step S28, where a determination is made whether the disengagement control flag is up, F (MCJ2)=1, or not. If the disengagement control flag is up, F (MCJ2) =1, then the control routine proceeds to Step S29, where a determination is made whether the clutch gradual release flag is up, F (MCJ3)=1, or not. If the clutch gradual release flag is up, F (MCJ3)=1, then a small value α(1) is set as a pressure reduction value α to reduce the clutch control pressure gradually because the starting clutch 5 needs to be released gradually. On the other hand, if the clutch gradual release flag is down, F (MCJ3)=0, then a large value α(2) (>α(1)) is set as the pressure reduction value α to reduce the clutch control pressure rapidly because the starting clutch 5 can be released quickly as the torque capacity of the clutch is zero.

At Step S32, this pressure reduction value α is subtracted from the starting clutch control pressure PC (CMMC) at the moment, and the value resulted from this subtraction is compared with the target value, i.e., the target clutch pressure PC (CMBS) set at Step S24. If the target value is smaller than the value calculated in the above subtraction, i.e., the starting clutch control pressure has not decreased to the target value, then the control routine proceeds to Step S33, where the value resulted from the subtraction of the pressure reduction value α from the current starting clutch control pressure PC (CMMC) is set as a new starting clutch control pressure to control the starting clutch.

On the other hand, if the target value is equal to or greater than the value calculated in the above subtraction, i.e., the starting clutch control pressure has decreased to the target value, then the control routine proceeds to Steps S34, S35 and S36. There, the disengagement control flag is set down, F (MCJ2)=0, at Step S34, the clutch gradual release flag is set down, F (MCJ3)=0, at Step S35, and the target clutch pressure PC (CMBS) is set as the starting clutch control pressure PC (CMMC) at Step S36. It is clear from the above description that, in the starting clutch disengaging control S20, the clutch control pressure is decreased gradually to the target clutch pressure PC (CMBS), i.e., the starting clutch 5 is released gradually.

Now, a description is given of the engine stop control S50 shown in FIG. 6. In this control, at first, a determination is made whether the starting clutch off mode selection flag is up, F (SCMD)=1, or not at Step S51. If it is down, F (SCMD)=0, which condition indicates that the above mentioned starting clutch disengaging control S20 is not being performed, then the control routine proceeds to Step S54, where an idling elimination control flag is set down, F (ISOFF)=0. In this case, the idling elimination control is not performed. On the other hand, if the starting clutch off mode selection flag is up, F (SCMD)=1, which condition indicates that the above mentioned starting clutch disengaging control S20 has been started, then the control system judges that the conditions required for stopping the engine are satisfied and allows the engine to be stopped by maintaining the stoppage of the fuel injection. Therefore, the control routine proceeds to Step S52, where a determination is made whether or not the disengagement control flag is down, F (MCJ2)=0, i.e., whether the control for releasing the starting clutch 5 gradually so as to make the torque capacity of the starting clutch 5 zero has completed or not.

If the disengagement control flag is up, F (MCJ2)=1, which condition indicates that the control for releasing the starting clutch 5 is being executed, then the control routine proceeds to Step S54, where the idling elimination control flag is set down, F (ISOFF)=0, and the idling elimination control is not yet started. If the disengagement control flag is down, F (MCJ2)=0, which condition indicates that the control for releasing the starting clutch 5 has completed, then the control routine proceeds to Step S53, where the idling elimination control flag is set up, F (ISOFF)=1, and the idling elimination control is executed. Specifically, this idling elimination control stops the engine forcibly by using the electrical motor.

In this way, when the brake is operated to stop the vehicle while the vehicle is decelerating without fuel injection, the idling elimination control is executed after the control to release the starting clutch 5 gradually is complete. In this condition, the speed change ratio of the transmission is set at the LOW ratio.

After the idling elimination control, the electrical currents supplied to the electromagnetic valves which control the speed change of the continuously variable transmission CVT are controlled to become zero. This control step S60 whose sub-steps are shown in FIG. 7 is referred to as "current supply termination control". Before explaining this control in detail, in reference to the hydraulic circuit diagram shown in FIG. 8, a brief description is given of the hydraulic circuit of the continuously variable transmission CVT, which circuit controls the speed change operation of the transmission.

As shown in FIG. 8, a hydraulic pump P driven by the engine E delivers hydraulic oil from a tank into an oil passage 101 leading to a regulator valve 41, where the pressure of the oil is adjusted to a high control pressure PH, which is output into an oil passage 102. One branching passage 102a of the oil passage 102 is connected to a reducing valve 42, where the high control pressure PH supplied from the oil passage 102a is adjusted to a low control pressure PL and delivered to an oil passage 103. Another oil passage 102b branching from the oil passage 102 further branches into two oil passages 102c and 102d. One oil passage 102c is connected to a drive-pulley speed change control valve 43, where the high control pressure PH is adjusted to a pulley control pressure Pp1, which is then delivered through an oil passage 105 to the above mentioned drive-pulley cylinder chamber 14. The other oil passage 102d is connected to a driven-pulley speed change control valve 44, where the high control pressure PH is adjusted to a pulley control pressure Pp2, which is then delivered through an oil passage 106 to the above mentioned driven-pulley cylinder chamber 19 (these pulley control pressures Pp1 and Pp2 act on the above mentioned movable pulley halves 13 and 18, thereby varying the speed change ratio of the continuously variable transmission CVT).

Furthermore, the oil passage 103 branches into two oil passages 103a and 103b. One oil passage 103a is connected to a drive-pulley electromagnetic valve 45, where the low control pressure PL is adjusted to a control pressure Pc1, which is delivered into oil passages 107 and 109. The other oil passage 103b is connected to a driven-pulley electromagnetic valve 46, where the low control pressure PL is adjusted to a control pressure Pc2, which is delivered into oil passages 108 and 110. The control pressure Pc1 of the oil passage 109 and the control pressure Pc2 of the oil passage 110 are used by a high pressure control valve 47 to produce a regulator valve control pressure Pcr, which is delivered into another oil passage 111 as back pressure for the regulator valve 41. The control pressure Pc1 generated by the drive-pulley electromagnetic valve 45 in the oil passage 107 is fed back through an oil passage 107a which branches from the oil passage 107, to the drive-pulley electromagnetic valve 45 itself as back pressure. The control pressure Pc2 generated by the driven-pulley electromagnetic valve 46 in the oil passage 108 is fed back through an oil passage 108a which branches from the oil passage 108, to the driven-pulley electromagnetic valve 46 itself as back pressure.

On the spool 45a of the drive-pulley electromagnetic valve 45, the following three biasing forces are acting: a first biasing force being generated by a spring 45b provided in this valve and being directed leftward, a second biasing force being generated electromagnetically by the current supplied from the electrical control unit ECU through the solenoid 45c of the same valve and being directed rightward, and a third biasing force being generated by the back pressure supplied through the oil passage 107a and being directed rightward. In the balance of these three biasing forces, the low control pressure PL supplied from the oil passage 103a is adjusted to the control pressure Pc1. In the same way, on the spool 46a of the driven-pulley electromagnetic valve 46, the following three biasing forces are acting: a first biasing force being generated by a spring 46b provided in this valve and being directed leftward, a second biasing force being generated electromagnetically by the current supplied from the electrical control unit ECU through the solenoid 46c of the same valve and being directed rightward, and a third biasing force being generated by the back pressure supplied through the oil passage 108a and being directed rightward. In the balance of these three biasing forces, the low control pressure PL supplied from the oil passage 103b is adjusted to the control pressure Pc2.

As shown in FIG. 8, this transmission incorporates an engine rotational speed detector 51, which detects the rotational speed Ne of the engine, and first and second timers 52 and 53, each of which starts a count-down from a preset time upon receiving a command from the electrical control unit ECU and sends the remaining time to the electrical control unit ECU.

Now, a description is given of the control executed at step S60 for terminating the current supply to the electromagnetic valves. As shown in FIG. 7, at first, a determination is made at Step S61 to find out whether the idling elimination control has executed at the previous step, Step S50, or not, i.e., whether the idling elimination control flag is up, F (ISOFF)=1, or not. Here, if the idling elimination control flag is up, F (ISOFF)=1, then an idling elimination judgment flag is set up, F (CVTOK)=1, at Step S62. On the other hand, if the idling elimination control flag is down, F (ISOFF)=0, then the idling elimination judgment flag is set down, F (CVTOK)=0, at Step S63.

Next, a determination is made to find out whether the temperature T of the hydraulic oil in the hydraulic circuit which is to control the speed change ratio of the continuously variable transmission CVT is equal to or more than a predetermined reference temperature T0 or not at Step S64. Here, the reference temperature T0 is determined as a temperature at which the pressure generated in the hydraulic circuit by the hydraulic pump can decrease quickly to the original pressure after the pump stops because of the termination of the operation of the engine. Therefore, the reference temperature T0 is set at, for example, 10~20 degrees Celsius. The temperature T of the hydraulic oil can be detected, for example, by measuring the change of the electrical resistance of the solenoid 45c of the drive-pulley electromagnetic valve 45 (or the solenoid 46c of the driven-pulley electromagnetic valve 46). If this method is applied for the detection of the temperature T, then an error range of about 10 degrees is expected. In this case, it is preferable that the reference temperature T0 be set at approximately 30 degrees to tolerate the error range.

At Step S64, if the temperature T of the hydraulic oil is judged equal to or higher than the above mentioned reference temperature T0, then the control routine proceeds to Step S65, where another determination is carried out whether the idling elimination judgment flag is up, F (CVTOK)=1, or not. Here, if the idling elimination judgment flag is judged being up, F (CVTOK)=1, then the control routine proceeds to Step S66, where another determination is made whether or not the engine rotational speed Ne is smaller than a predetermined reference rotational speed Neo (for example, 400 rpm), which is smaller than the idling rotational speed of the engine.

At Step S66, if the engine rotational speed Ne is judged equal to or more than the above mentioned reference rotational speed Neo, i.e., Ne $\zeta$ Neo, then the time TM1 of the first timer 52 is set at Step S67. On the other hand, at Step S64, if the temperature T is judged lower than the reference temperature T0, and at Step S65, if the idling elimination judgment flag is judged being down, F (CVTOK)=0, which indicates that the idling elimination control is not performed, then the control routine proceeds also to Step S67, where the time TM1 of the first timer 52 is set. The time TM1 is determined as a time expected to elapse after the engine rotational speed Ne has decreased below the above mentioned reference rotational speed Neo (Ne<Neo) and until the pressure PL of the oil passage 103a leading to the drive-pulley electromagnetic valve 45 from the pump P (or the oil passage 103b leading to the driven-pulley electromagnetic valve 46 from the pump P) begins to decrease. Therefore, the time TM1 is determined in consideration of the temperature T of the oil in the hydraulic circuit, which temperature value is used at Step S64. The lower the temperature T is, the longer the time TM1 is set.

After the setting of the time TM1 of the first timer 52, the time TM2 of the second timer 53 is set at Step S68. The time TM2 is determined as a time expected to elapse after the pressure PL of the oil passage 103a (or the oil passage 103b) has begun to decrease and until the spool 45a of the drive-pulley electromagnetic valve 45 (or the spool 46a of the driven-pulley electromagnetic valve 46), which spool is being shifted by the spring 45b toward the wall of the valve housing because of the unbalance created by the decreasing third biasing force (rightward biasing force generated by the back pressure), reaches a position where it may cause chattering. Also, the time TM2 is determined in consideration of the temperature T of the oil in the hydraulic circuit, which temperature value is used at Step S64. The lower the temperature T is, the longer the time TM2 is set.

After the setting of the time TM1 and time TM2 for the first and second timers 52 and 53, respectively, at Step S67 and Step S68, a calculation is made at Step S69 for an appropriate current which must be supplied to the drive-pulley electromagnetic valve 45 to generate the pulley control pressure Pp1 required for adjusting the movable pulley half 13 momentarily (this current is referred to as "drive-pulley pressure control current Idr"). After the calculation, the control routine proceeds to Step S70, where a calculation is made for an appropriate current which must be supplied to the driven-pulley electromagnetic valve 46 to generate the pulley control pressure Pp2 required for adjusting the movable pulley half 18 momentarily (this current is referred to as "driven-pulley pressure control current Idn").

After the calculations of the respective current values at Steps S69 and S70, the electrical control unit ECU outputs the drive- and driven-pulley pressure control currents Idr and Idn to the control valve CV. Upon receiving these electrical currents, the control valve CV works to generate the appropriate pulley control pressures Pp1 and Pp2 for adjusting the movable pulley halves 13 and 18. The drive- and driven-pulley pressure control currents Idr and Idn which are generated after the execution of the idling elimination control are to maintain the speed change ratio of the transmission at the LOW ratio.

If the engine is almost stopped, i.e., if the engine rotational speed Ne is judged lower the reference rotational speed Neo, i.e., Ne<Neo, at Step S66, then the first timer 52 is started to count down. At Step S71, a determination is made whether the remaining time from the time TM1 (which is set most recently at Step S67) has become zero or not. If the remaining time of the first timer 52 is not yet zero, then the control routine proceeds to Step S69. On the other hand, if the remaining time of the first timer 52 has become zero, then the control routine does not proceeds to Step S69 but starts the second timer 53 to count down. At Step S72, a determination is made whether the remaining time from the time TM2 (which is set most recently at Step S68) has become zero or not.

If the remaining time of the second timer 53 is judged not yet zero at Step S72, then the control routine proceeds to set the drive-pulley pressure control current Idr to a current value Idr1 at Step S73 and then to set the driven-pulley pressure control current Idn to a current value Idn1 at Step S74. Here, the current values Idr1 and Idn1 are determined each to generate a biasing force (second biasing force) electromagnetically in a magnitude which can supplement the decreasing biasing force (third biasing force) which is generated by the back pressure acting to the drive-pulley electromagnetic valve 45 (or 46) during the elapse of the predetermined time TM2 after the engine rotational speed Ne has become lower than the above mentioned reference rotational speed Neo and the pressure PL of the oil passage 103*a* (or 103*b*) has began to decrease. These biasing forces generated as supplements work to generate the pressures in the variable width drive and driven pulleys 11 and 16, respectively, such that these pulleys are controlled without any slip of the metal V-belt 15. These biasing forces are determined not to be too strong to push the spools 45*a* and 46*a* rightward and to cause a chattering of the spools against the walls of the housings, respectively, and they are also determined in consideration of the inertia of the driven pulley and of safety factor. The current values Idr1 and Idn1 set here are greater than the drive- and driven-pulley pressure control currents Idr and Idn which are set for the period after the engine rotational speed Ne has become below the reference rotational speed Neo and until the pressure PL of the oil passage 103*a* (or 103*b*) begins to decrease.

On the other hand, if the remaining time is judged zero at Step S72, then the drive-pulley pressure control current Idr is set to a current value Idr0 at Step S75, and then the driven-pulley pressure control current Idn is set to a current value Idn0 at Step S76. Here, the current values Idr0 and Idn0 may be zero, which is equivalent to the termination of the current supply, or may be a faint current value close to zero (for example, 1.5 mA) which is detectable to watch the electrical wire of the drive- and driven-pulley electromagnetic valves 45 and 46 for any breaking.

Summarizing the control processes executed at Step S66 and thereafter by the electrical control unit ECU, after the idling elimination control, the drive- and driven-pulley electromagnetic valves 45 and 46 are supplied with currents necessary for maintaining the speed change ratio of the transmission at the LOW ratio until the engine rotational speed Ne becomes below the reference rotational speed Neo, which is lower than the idling rotational speed of the engine, and until the time TM1 set for the first timer 52 elapses after the engine rotational speed Ne has become below the idling rotational speed Neo (i.e., after the engine rotational speed Ne has become below the idling rotational speed Neo and until the pressure PL of the oil passage 103*a* (or 103*b*) begins to decrease). After the elapse of the time TM1, the electromagnetic valves are supplied with predetermined currents which are larger than the previous currents until a predetermined time elapses (i.e., after the pressure PL of the oil passage 103*a* (or 103*b*) has begun to decrease and until the time TM2 set for the second timer 53 elapses). After the time TM2 has elapsed, the currents supplied to the drive- and driven-pulley electromagnetic valves 45 and 46 are adjusted almost to zero.

In reference to FIG. 8, a description is given of how the spools 45*a* and 46*a* of the drive- and driven-pulley electromagnetic valves 45 and 46 behave during the execution of the above described control. After the engine rotational speed Ne has become below the reference rotational speed Neo, when the pressure PL of the oil passage 103*a* (or 103*b*) begins to decrease, the control pressures Pc1 and Pc2, which act as back pressures to the electromagnetic valves 45 and 46, start to decrease accordingly. As the rightward biasing force (third biasing force) begins to become smaller, the spools 45*a* and 46*a* are about to be shifted leftward by the leftward biasing force being generated by the springs 45*b* and 46*b* (first biasing force) in the housings of the respective electromagnetic valves. Here, if the currents supplied to the electromagnetic valves 45 and 46 were unchanged, then the spools 45*a* and 46*a* would be shifted leftward by the forces of the springs 45*b* and 46*b* in correspond to the decrease of the back pressures, each spool finally causing a chattering or a displeasing vibration and noise with the wall of the valve housing.

However, with the above described control, in each electromagnetic valve, when the pressure PL of the oil passage 103*a* (or 103*b*) begins to decrease, an electromagnetic biasing force (second biasing force) is created in a magnitude which can supplement the biasing force (third biasing force) by the decreasing back pressure during a period after the control pressure Pc1 or Pc2, which acts as back pressure, has begun to decrease and until a predetermined time (time TM2) elapses. Therefore, it is not possible for the spool 45*a* or 46*a* of the electromagnetic valve 45 or 46 to shift and to cause a chattering with the wall of the housing when the pressure PL of the oil passage 103*a* (or 103*b*) decreases. Thus, the control according to the present invention effectively prevents the electromagnetic valves 45 and 46 from causing any displeasing vibration and noise.

Figure 9:
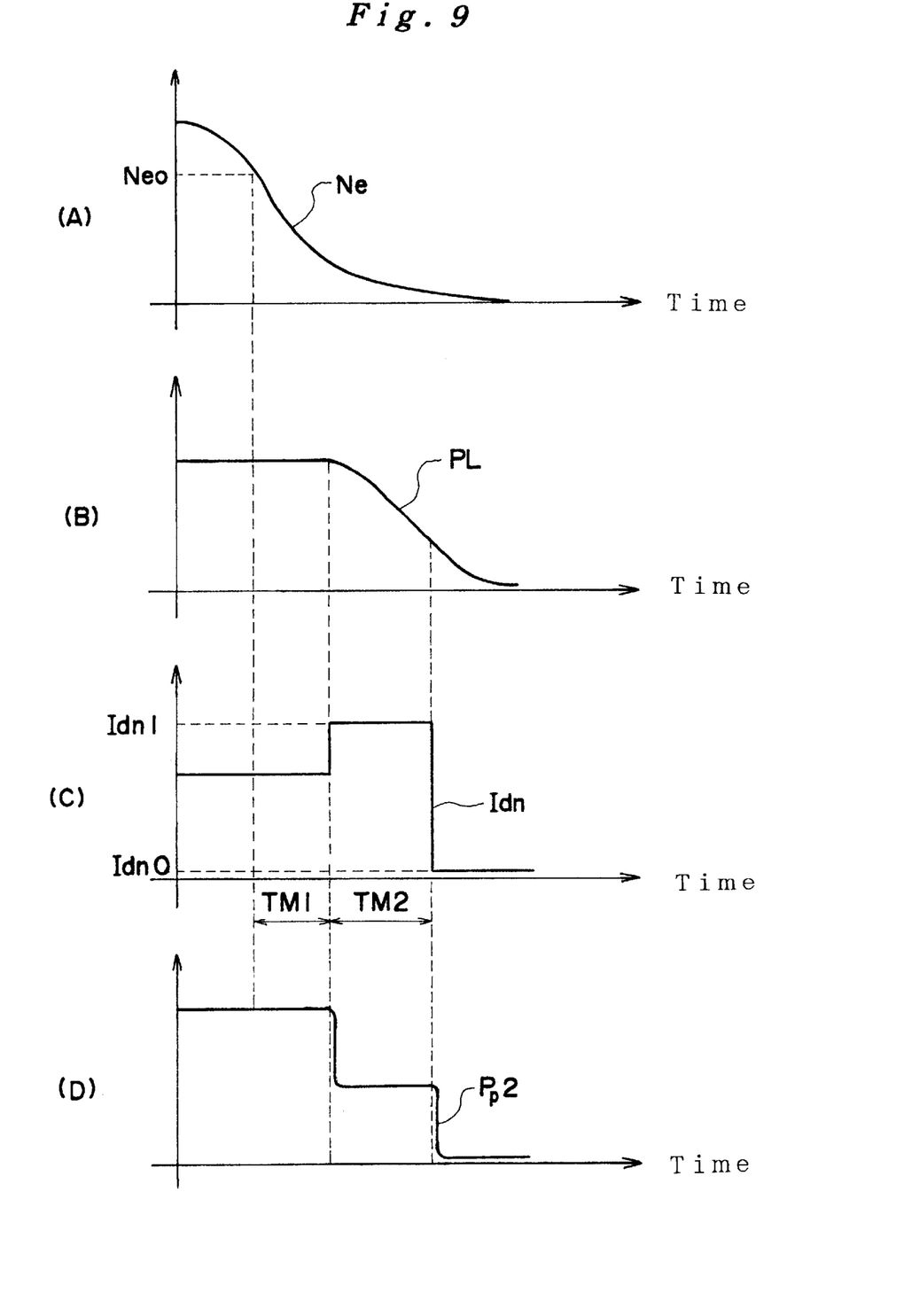
FIG. 9 carries graphs which show the chronological changes of the following respective values which changes occur after the execution of the idling elimination control: (A) the rotational speed Ne of the engine, (B) the pressure PL inside the oil passage connecting between an electromagnetic valve provided for the driven pulley of the transmission and a hydraulic pump, (C) the control current Idn supplied to control the pressure of the driven pulley and (D) the pressure Pp2 which controls the driven pulley.

After the above mentioned predetermined time (time TM2) has elapsed, the currents supplied to the electromagnetic valves 45 and 46 are set almost to zero. In this condition, the source of vibration which may cause a chattering is terminated, so there is no possibility of vibration or noise to occur. As described above, even though the engine rotational speed Ne becomes below the reference rotational speed Neo, the predetermined pulley control pressures Pp1 and Pp2 necessary for maintaining the speed change ratio at the LOW ratio are secured until the pressure PL of the oil passages 103*a* and 103*b* begins to decrease. Because of this, there is no slippage of metal V-belt 15. FIG. 9 shows the chronological changes of (A) the engine rotational speed Ne, (B) the pressure PL inside the oil passage 103*b*, (C) the driven-pulley pressure control current Idn and (D) the pulley control pressure Pp2 after the execution of the idling elimination control.

The above described control may be modified in the following manner. After the engine rotational speed Ne has become below the reference rotational speed Neo, which is lower than the idling rotational speed of the engine, and after the pressure PL of the oil passage 103*a* leading to the electromagnetic valve 45 from the hydraulic pump P and the oil passage 103*b* leading to the electromagnetic valve 46 from the hydraulic pump P has begun to decrease, the currents supplied to the electromagnetic valves 45 and 46 are set almost to zero. In other words, the time TM2 is set to zero at Step S68, and just after the elapse of the time TM1, the drive-pulley pressure control current Idr and the driven-pulley pressure control current Idn are set to the above mentioned current values Idr0 and Idn0 (zero or a small current value close to zero).

In this control, after the engine rotational speed Ne has become below the reference rotational speed Neo and after the pressure PL of the oil passages 103a and 103b begins to decrease, the currents supplied to the electromagnetic valves 45 and 46 are set almost to zero. As the source of vibration which may cause a chattering is terminated, there is no possibility of vibration or noise to occur. Also, in this case as in the above described control, even though the engine rotational speed Ne becomes below the reference rotational speed Neo, the predetermined pulley control pressures Pp1 and Pp2 necessary for maintaining the speed change ratio of the transmission at the LOW ratio are secured until the pressure PL of the oil passages 103a and 103b begins to decrease. There will be no slippage of metal V-belt 15.

The above transmission comprises an engine whose drive force is assisted by the operation of an electrical motor. However, the present invention is not limited to this type of transmission and can be implemented also with a transmission which does not incorporate an electrical motor. Not only the above metal V-belt type continuously variable transmission but also other types of transmission, even a transmission of multiple speed ratios, can be utilized for the implementation of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 11-209932 filed on Jul. 23, 1999, which is incorporated herein by reference.

What is claimed is:

1. A control system for a mechanical power transmission used for driving a vehicle, comprising:

an engine;

a speed change mechanism which transmits a driving force with a speed change from said engine;

a speed change actuator which operates said speed change mechanism to vary a speed change ratio;

a hydraulic pump which delivers hydraulic oil, said pump being driven by said engine; and an electromagnetic valve which is disposed between a first oil passage and a second oil passage, said first oil passage being connected to said pump, and said second oil passage being connected to said speed change actuator;

wherein:

said electromagnetic valve adjusts a pressure of said oil from said pump in a balance of first, second and third biasing forces and produces a control pressure which is used for operating said speed change actuator, delivering said control pressure into said second oil passage, said first biasing force being generated by a resilient member, said second biasing force being generated electromagnetically and said third biasing force being generated by a back pressure from said second oil passage, and after a rotational speed of said engine has become below a reference rotational speed which is lower than an idling rotational speed and after said pressure of said first oil passage begins to decrease, a current supplied to said electromagnetic valve is set almost to zero.

2. The control system as set forth in claim 1, wherein:

after said rotational speed of said engine has become below said reference rotational speed, which is lower than said idling rotational speed, and after said pressure of said first oil passage begins to decrease, for a predetermined time, said current to said electromagnetic valve is adjusted and supplied to generate said second biasing force in a magnitude that can supplement a decrease in said third biasing force caused from a decrease in said pressure of said first oil passage; and after said predetermined time has elapsed, said current supplied to said electromagnetic valve is set almost to zero.

3. The control system as set forth in claim 1 or 2, further comprising an electrical motor, which is connected to an output shaft of said engine, so that said electrical motor assists said driving force of said engine.

4. The control system as set forth in claim 1 or 2, wherein:

when an accelerator pedal, which has been stepped down, is released to decelerate said vehicle, a control for terminating fuel supply to said engine is executed; and when said vehicle is brought into a halt, said control is continued to stop said engine.

5. The control system as set forth in claim 1, wherein:

said speed change mechanism comprises a V-belt type continuously variable speed change mechanism; and said speed change actuator adjusts a thrust that acts laterally in drive and driven pulleys which are incorporated in said belt type continuously variable speed change mechanism.

* * * * *

UNITED STATES PATENT AND TRADEMARK OFFICE
CERTIFICATE OF CORRECTION

PATENT NO. : 6,338,695 B1
DATED : January 15, 2002
INVENTOR(S) : Aoki et al.

It is certified that error appears in the above-identified patent and that said Letters Patent is hereby corrected as shown below:

<u>Title page,</u>
Item [*] Notice, delete the phrase "by 8 days" and insert -- by 12 days --

Signed and Sealed this

Twenty-eighth Day of September, 2004

JON W. DUDAS
*Director of the United States Patent and Trademark Office*